H. W. LEONARD.
CONTROLLER FOR ELECTRIC MOTORS AND SIMILAR DEVICES.
APPLICATION FILED MAY 17, 1907. RENEWED JULY 22, 1909.
1,077,613.
Patented Nov. 4, 1913.
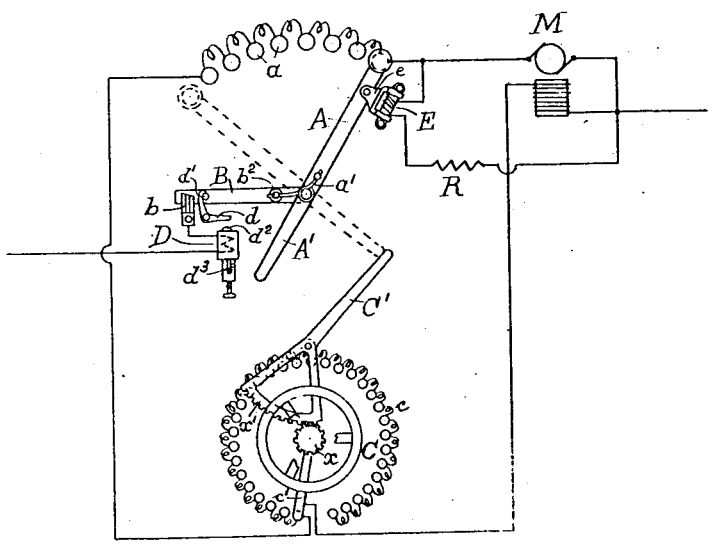

UNITED STATES PATENT OFFICE.

HARRY WARD LEONARD, OF BRONXVILLE, NEW YORK.

CONTROLLER FOR ELECTRIC MOTORS AND SIMILAR DEVICES.

1,077,613.   Specification of Letters Patent.   Patented Nov. 4, 1913.

Original application filed July 11, 1903, Serial No. 165,061. Divided and this application filed May 17, 1907,. Serial No. 374,129. Renewed July 22, 1909. Serial No. 509,063.

*To all whom it may concern:*

Be it known that I, HARRY WARD LEONARD, a citizen of the United States, residing at Bronxville, in the county of Westchester and State of New York, have invented certain new and useful Improvements in Controllers for Electric Motors and Similar Devices, of which the following is a full, clear, and exact specification.

This application is a division of my pending application for improvement in controllers for electric motors and similar devices, filed July 11, 1903, Serial No. 165061.

My invention relates principally to the devices employed for starting and regulating the speed of electric motors, and to the devices employed for protecting such devices and the motor against damage due to abnormal variations in the circuit.

Heretofore such devices, and particularly the starters and field controllers, were preferably entirely separate pieces of apparatus and were operated independently of each other. Such arrangement of the controlling devices are frequently the cause of injury to the motor and controlling means due to the improper operation of the separate devices and to carelessenss or ignorance on the part of the operator.

One object of my invention is to combine a motor starter, speed regulator and automatic protective devices with interlocking means, whereby the several elements constituting a controller can only be operated in the proper sequence to start and regulate a motor, and so that the protective devices will always be in a position to respond to abnormal changes in the motor circuit, and whereby the starting of a motor and the control of its speed will be "fool proof"; that is to say, the controlling apparatus and the motor will be entirely safe, even in the hands of inexperienced, careless or ignorant operators.

In the operation of many kinds of machine tools and other appliances by electric motors, it is very desirable that there be provided a simple, efficient, reliable, inexpensive and compact form of controlling apparatus by means of which the motor can be started and brought to full speed, and later, if necessary, operated at any speed over as wide a range of speed as possible. On account of the efficiency and simplicity of the method, it is very desirable to secure the speed variation by varying the field strength of the motor. Electric motors have now been so far improved as regards freedom from sparking, that they require very little attention in operation, even when the field is varied over a very wide range, and hence in the future these motors will be very extensively employed in the operation of machine tools and in performing many other kinds of work where a wide range of speed is of value, and especially where the torque varies inversely as the speed to such an extent that the power of the motor is more or less constant.

The controlling apparatus for such motors should have the following characteristics:— First, an overload protective device which will positively and instantaneously open the circuit to the motor if under any conditions of starting or operation a current greater than a certain predeterminable amount should flow in the motor circuit. Second, this overload device must be such that the motor can be safely and simply started up again by the operator without loss of time and without expense. Third, a "no-voltage release," or electroresponsive device which will automatically act if the supply voltage fails, or is reduced to a very low point, to protect the motor against the risks due to a sudden rise to full voltage, and such "no-voltage" device shall be dependent upon the volts upon the motor armature and shall be independent of any current through the motor. Fourth, a device by the manipulation of which the operator can readily change the speed of the motor gradually and over a wide range, so that, for example, a cutting tool can be worked in the most efficient manner at any speed and cut within the capacity of the motor. Fifth, a starting rheostat. Sixth, interlocking or functionally related mechanism, or equivalent arrangement of mechanism, which will insure the proper sequence of adjustments, and whereby it will be impossible for the operator to start the motor while the motor has an improperly weakened field. While this interlocking or equivalent mechanism is preferably arranged directly between the speed controlling device and the motor starter, it is evident that it may be applied between any device controlling the speed controller and any device which controls the current passing through the motor armature, such as a switch in series with the motor armature and starter.

The desirable features above set forth are embodied in the controller invented by me, and in carrying my invention into effect, I preferably employ a "no-voltage" switch and an "overload" switch, which are functionally connected, and the "no-voltage" switch serving also as the contact arm of the starting rheostat. Both of these switches are preferably spring actuated so as to tend to move to the open circuit position, and the overload switch is preferably moved to its closed position by the movement of the "no-voltage" switch to its starting position. The overload switch is held closed by a latch which is released through the agency of an electroresponsive device which is set to respond to a predetermined flow of current, and the "no-voltage" switch may be held by a similar form of latch, which is released through the agency of an electroresponsive device which responds to an abnormal drop in the voltage, or said switch may be held by magnetism against the pull of the spring connected with said switch, so that when the voltage fails or drops abnormally, the magnetism will be insufficient to hold the switch against the pull of its spring. I also employ a rheostat which is designed to be connected in series with the field winding of the motor. This rheostat preferably has a large number of steps so as to secure great refinement in the graduation of the field strength of a motor, and thus secure perfect control of the speed of the motor armature. Between the operating devices of the starting rheostat and the field rheostat, I provide in my preferred form an interlocking or otherwise functionally related device, the function of which is to so relate the motor starting switch or starting rheostat to the field controlling means, that the starting of the motor when the field is too weak to secure the best results, is avoided. This interlocking or functionally relating device consequently insures that the motor field will always have a proper strength when the motor is started.

My invention is illustrated in the accompanying drawing, in which the figure is a diagram illustrating one form of my invention.

Referring to the drawing, A indicates the contact arm of the motor starter, and $a$ the contact buttons of the resistance sections. B is the overload switch which enters spring contact blades $b$. A and B are pivoted on a common stud, and a spring $a'$ coiled around the stud, and having its ends secured to the switch arms, tends to drive said arms toward each other. $b^2$ is a rubber or other buffer on switch arm B against which arm A strikes when either arm is propelled by its spring, and to which switch B is moved to its closed position by arm A.

Switch B is held in its closed position by a latch $d$, engaging pin $d'$ on the switch. This latch is pivoted upon the base plate and is tripped by a plunger $d^2$ which is actuated by a blow from the core of overload solenoid D. The position of this core is adjustable by means of a screw $d^3$, whereby the overload device will be caused to respond to a predetermined current flow. The no-voltage switch or starting lever A is provided with an armature $e$ which is held by the magnetism of magnet E in the form shown in Fig. 1 when the arm is in its final position. Upon an abnormal drop in the voltage, the magnetism of magnet E will be insufficient to hold lever A against the pull of its spring and hence that lever will then return to its initial position. If an overload should occur switch B would be released and it would open the circuit and move toward arm A until arrested by the buffer $b^2$. This opening of switch B also deënergizes magnet E, and in order to close switch B again, arm A is returned to its starting position—the position shown by dotted lines in the drawings. C is the operating device for the field rheostat, the resistance $c$ of which may be enameled to a metal plate. This operating device is secured to a shaft which has secured to its opposite end the contact blade $c'$.

In the particular form shown in the drawing, the contact arm of the starter, or an extension thereof, is so arranged that when it is moved from its final position to the initial position, it engages with the field controller and operates it so that when the contact arm of the starter reaches its initial position, the resistance of the field rheostat will be all cut out of circuit, and so places the operating device of the field rheostat in proper position for again starting the motor. In this form of construction, A' is the extension of arm A, and C' is a pivoted lever having its free arm in the path of movement of extension A', and the other end is a toothed arc $x'$ which meshes with spur gear $x$ on the shaft of operating device C. In practice, the contact buttons of a field rheostat are arranged to form almost a complete circle, so that in moving its contact blade from one extreme to the other, the operating device and shaft make nearly a complete revolution. For this reason, the toothed arc $x'$ will be provided with the same number of teeth as spur gear $x$ and be so proportioned, that in moving device C from one extreme position to the other, arm C' will move a distance corresponding to the angular movement of arm A' from its initial position to its final position. In the position shown in full lines, arm A A' is in the final position, and all the resistance of the field rheostat is cut out. Contact arm A and extension A' are free to move back and forth without striking lever C' when no resistance c is in circuit. If device C is rotated to cut in resistance, lever C' will move toward arm A', and should arm A be released and propelled toward its initial position, arm A' will encounter lever C' and drive that lever back to its initial position, so that the apparatus will be in proper position to again start the motor. It will also be noted that when arm A is in its initial or starting position, as shown in dotted lines, device C cannot be operated to connect resistance c into the field circuit of the motor since arm A' stands in the path of lever C' and locks it, and hence device C against movement.

In some cases the motor may have a series winding on the field, so that the field will be affected by the armature current. I have shown the "no-voltage" coil E, in Fig. 1, as connected across the motor armature terminals with a resistance R in series with it.

Although I have shown a specific form of my invention herein, my invention may be embodied in various other forms of construction, and it will be understood that my invention is not limited to the precise form herein shown and described.

My invention is also capable of use with currents of different forms and with various types of motors, such as motors of direct or alternating current type.

Having thus described my invention, I declare that what I claim as new and desire to secure by Letters Patent, is—

1. The combination with a motor having a shunt field winding, a rheostat in series with said field winding, an additional starting rheostat, means tending to move the contact arm thereof toward the initial position and which arm is designed to be held in its final position, an automatic release for said arm which responds when the supply voltage falls below a certain amount, the movement of said contact arm toward the initial position also causing the movement of the arm of said rheostat in series with the field winding toward the resistance all out position.

2. The combination with a motor having a shunt field winding, a rheostat in series with said field winding, an additional starting rheostat, means tending to move the contact arm thereof toward the initial position and which arm is designed to be held in its final position, an automatic release for said arm which responds when the supply voltage falls below a certain amount, the said contact arm when moving toward the initial position mechanically engaging the field adjusting means of said rheostat in series with the field winding and actuating the same to decrease the field resistance in circuit.

3. The combination of an electric motor, a starting resistance having a movable contact element, an additional field resistance having a movable contact element which may be moved independently of said first named element, a no-voltage device for retaining said first named element in final position, and means carried by said first named element adapted to engage said second element when said first element is released for moving said second element to its initial position.

4. The combination of an electric motor, a starting switch for closing the armature circuit of the motor, a field resistance having a movable element for varying said resistance, and means for returning said element toward the resistance all out position by the movement of said starting switch toward its open circuit position.

5. The combination of an electric motor having a permanently closed local loop containing the armature winding and a field winding, a starting switch for connecting and disconnecting said loop to and from the supply conductors, a field resistance having a movable element for varying said resistance, and means for returning said element toward the resistance all out position by the movement of said starting switch toward the open circuit position.

6. The combination of an electric motor, a starting switch for closing the armature circuit of the motor, a field resistance having a movable element for varying said resistance, means for returning said element toward the resistance all out position by the movement of said starting switch toward the open circuit position, and electro-responsive means for protecting the motor from over-load.

7. An electric motor having a field winding energized independently of its armature current, a spring actuated resistance controlling switch in series with the motor armature, electro-magnetic means responsive to no-voltage controlling the automatic movement of said switch upon the occurrence of no-voltage, a movable element for controlling the field of said motor, and means for controlling the automatic protective movement of said element controlled by the automatic movement of said switch and for insuring a proper sequence of their relative movement when the starting current is passed through the motor armature.

8. The combination of a motor starting rheostat having a movable element, an additional motor field rheostat having an independently movable element, means in common for controlling the movement of said two elements, a no-voltage electroresponsive device for normally counteracting said means, and means responsive to overload current through the motor armature for deënergizing said device.

9. The combination of a supply circuit, a motor having a shunt field winding, an armature resistance, a field resistance, means for connecting the armature of the motor, said armature resistance, said shunt field winding and said field resistance in series in a closed local loop, and motor controlling means comprising a no-voltage magnet and an automatically movable contact member, said magnet controlling the automatic movement of said member upon the occurrence of no-voltage to cause the field resistance to be cut out, the armature resistance to be cut in and the loop to be disconnected from the supply circuit.

10. The combination of a motor armature resistance having a controlling movable element, electromagnetic means responsive to no-voltage for retaining said element in its normal position, means for automatically moving said element when released upon the occurrence of no-voltage, and an additional motor field resistance having a controlling movable element adapted to be engaged mechanically by the automatic movement of said armature controlling element and to be automatically moved thereby.

11. The combination of supply conductors, an electric motor, an armature resistance, a field resistance, means for connecting the armature, armature resistance, motor field winding and field resistance in a closed loop, a movable element for controlling the armature resistance, an independently movable element for controlling the field resistance, and controlling means in common for automatically moving said movable elements upon the occurrence of no-voltage, said means comprising a magnetic winding connected in parallel with the motor armature and field winding with reference to the supply conductors.

12. In motor controlling apparatus, the combination of an automatically movable circuit controlling element, a controlling winding therefor normally energized independently of the current in the motor windings and responsive to no-voltage, a second circuit controlling element automatically moved by the automatic movement of the first element, and means whereby one of said elements controls a field resistance of the motor.

13. An electric motor controlling apparatus comprising an automatically movable circuit controlling element, a no-voltage electro-responsive device connected in parallel with the motor windings for controlling said element, a resistance having a movable element, and means whereby said latter element is automatically moved by the first named element to a circuit protective position upon the automatic movement of the first-named element.

14. In a motor controlling apparatus, an automatically movable circuit controlling element, a no-voltage device for controlling the automatic movement of said element, said device having the no-voltage winding connected in parallel with the motor windings, a field rheostat having an element for controlling the field resistance movable independently of said first-named element, and means whereby the resistance of said field rheostat is automatically cut out upon the automatic movement of the first-named element.

15. The combination of an electric motor, two independently mounted circuit controlling elements, one of said elements being a circuit opening switch and adapted to control the armature circuit of the said motor and the other the magnetic field of the motor, a no-voltage device for automatically controlling the armature controlling element and means whereby the automatic opening movement of the latter element causes the protective movement of the field controlling element.

16. In combination, a motor armature resistance, a motor field resistance, means for increasing one of said resistances and for decreasing the other resistance, and an electro-responsive winding connected across the motor armature and adapted to control the automatic increase of the one resistance and the automatic decrease of the other resistance.

17. In motor controlling apparatus, two independently manually movable, independently mounted, circuit controlling elements, one of said elements adapted to control the armature circuit and the other the field circuit of the motor, and means for automatically moving one of said elements and thereby cause the movement of the other of said elements and for insuring a proper sequence of manual movement of said elements.

18. Motor starting and speed regulating apparatus comprising a field resistance and a controlling arm therefor, a starting resistance having the control arm biased to the off position and movable independently of the field arm to vary its resistance, and means for preventing movement of the field arm until the starting arm has been moved from off position and for causing the field arm to be moved by the starting arm when the latter returns in response to its bias.

19. In combination, a movable member, a resistance controlled thereby, a second movable member, a resistance controlled by the latter member, means operatively connecting said members, said latter member being movable with the former member in one direction and the former member being movable independently of the latter member in the opposite direction, and a magnet for retaining the latter member in a predetermined position.

20. In combination, a movable member, a resistance controlled thereby, a second movable member, a resistance controlled by the latter member, means operatively connecting said members and for rendering said former member ineffective in controlling its resistance while the latter member occupies predetermined positions, said latter member being movable with the former member in one direction and said former member being movable independently of the other member in the opposite direction, and a magnet for retaining the latter member in a predetermined position.

21. In combination, a movable member, a resistance controlled thereby, a second movable member, a resistance controlled by the latter member, means operatively connecting said members, said latter member being movable with the former member in one direction and the former member being movable independently of the latter member in the opposite direction, means tending to keep the latter member in the initial position thereof, and a magnet for holding the latter member in a predetermined position.

22. In combination, a movable member, a resistance controlled thereby, a second movable member, a resistance controlled by the latter member, means operatively connecting said members to cause the latter member to move with the former member in one direction, the former member being movable independently of the latter member in the opposite direction, said latter member being adapted to decrease the resistance controlled thereby when it is moved with the former member and the former member being adapted to control its correlated resistance when it is moved independently of the latter member.

23. In combination, a supply circuit, a motor armature connected to said supply circuit, a motor field connected to said supply circuit, a resistance connected independently in series with the field in said field circuit to cause the same current to pass through the field as passes through said resistance, a second resistance connected in said armature circuit, a movable member for controlling said field circuit, and a second movable member for controlling said armature circuit, said second member movable in one direction to remove the resistance controlled thereby from the armature circuit, and said first member movable in an opposite direction to insert the resistance controlled thereby in the field circuit.

24. In combination, a motor having a field winding energized independently of its armature current, motor controlling means comprising a resistance for the armature circuit, a resistance for the field circuit, two manually movable members, said two members controlling the operative control of said resistances and being so protectively related as to enforce a definite sequence in their manual operation in accelerating the motor, and means for automatically moving at least one of said members to protectively vary said field resistance upon no-voltage, the last mentioned means comprising a winding energized independently of the current in said field winding.

25. In combination, an electric motor, a field resistance, a movable member adapted to vary said field resistance, a second movable member, means operatively connecting said members, said second movable member being movable with the other said movable member in one direction, and the member adapted to vary the field resistance being movable independently of said second movable member in the opposite direction, means dependent upon the position of said second movable member for rendering ineffective the field resistance varying member in its control of said field resistance, and a magnet for retaining the said second movable member in a predetermined position.

26. In combination, a movable member, a resistance controlled thereby, a second movable member, a resistance controlled thereby, means for connecting said members to cause the same to move in one direction together but permitting said first movable member to move in an opposite direction independently of the second member, and means for automatically returning both members to their initial position upon the release of said second member.

27. In combination, a movable member, a resistance controlled thereby, a second movable member, a resistance controlled thereby, means for connecting said members to cause the same to move in one direction together but permitting said first movable member to move in an opposite direction independently of the second member, a retaining-magnet for holding the second member in a predetermined position, and means for automatically returning both members to their initial position upon the release of said second member.

28. In combination, a supply-circuit, a motor-armature connected in said supply circuit, a motor-field connected in said supply-circuit, a resistance connected in said field-circuit, a second resistance connected in said armature-circuit, a movable member movable in one direction to remove said field resistance from circuit, a second movable member movable in an opposite direction to remove said armature resistance from circuit, and a magnet connected in said supply-circuit for retaining said second movable member in a predetermined position.

29. In combination, a movable member, a resistance controlled thereby, a second movable member, a resistance controlled thereby, a magnet to retain said second movable member in a predetermined position, and means for causing said members to move together when said second member is released by said magnet, said first member being movable independently of said second member under certain operative conditions.

30. In combination, a movable element, a resistance controlled thereby, a second movable element, a resistance controlled thereby, means tending to keep said second movable member in its initial position, a magnet for retaining said second member in a predetermined position, and means whereby said members will move together when said second member is released by said magnet, said first member being movable independently of said second member under certain operative conditions.

31. In combination, a movable member, a resistance controlled thereby, a second movable member, a resistance controlled thereby, restraining means adapted to retain said second movable member in a predetermined position, and means for causing said members to move together when said second member is released by said restraining means, said first member being movable independently of said second member under certain operative conditions.

32. The combination of an electric motor, a starting resistance having a movable contact element, an additional field resistance having a movable contact element which may be moved independently of said first named element, a no-voltage device for retaining said first named element in final position, and means carried by said first named element adapted to engage said second element when said first element is released for moving said second element to its initial position and for controlling the connection of the field circuit with the supply circuit.

33. The combination of an electric motor, a starting switch for closing the armature circuit of the motor, a field resistance having a movable element for varying said resistance, and means for returning said element toward the resistance all-out position by the movement of said starting switch toward its open-circuit position, said starting switch being movable independently of said movable element.

34. The combination of supply conductors, an electric motor having a field winding, an armature resistance, a field resistance, means for connecting the armature of said motor, said armature resistance, said field winding and said field resistance in a closed local loop, a movable element for varying the armature resistance and the field resistance, and means for causing the automatic movement of said movable element upon the occurrence of no-voltage, said means comprising a magnetic winding connected in parallel with the motor windings with reference to the supply conductors.

35. The combination of supply conductors, an electric motor, an armature resistance, an additional field resistance, the said armature, armature resistance, motor field winding and field resistance being connected in a closed loop, a movable element for controlling the armature resistance and for controlling the connection of said loop to the supply conductors, an independently movable element for controlling the field resistance, means for automatically operatively moving the armature resistance element to a protective position upon the occurrence of no-voltage, and means dependent upon the automatic movement of said armature resistance element for automatically moving the field resistance element.

36. The combination of an electric motor, a starting rheostat having a movable element, means for automatically moving said element in response to no-voltage, an additional field rheostat having an independently movable element, and means dependent upon the automatic movement of said first named element for automatically moving said second element, the automatic movement of said movable element of the starting rheostat controlling the disconnection of the field circuit of the motor from the supply conductors.

37. The combination of a constant electromotive force supply circuit, a motor connected therewith and having a field winding energized independently of its armature current, controlling means for said motor comprising two operatively, protectively mutually related resistance-controlling movable members, one of said members being adapted to control the circuit of the motor armature, and the other of said members being adapted to control the said motor field winding, and protective means comprising a no-voltage winding energized independently of the currents in said armature and said field winding insuring that the field-controlling resistance will be sufficiently low in value when the starting current is passed through the motor armature.

38. The combination of a permanently closed local loop containing the armature and a field winding of an electric motor, a constant electromotive force supply circuit, means for connecting said loop to said supply circuit so that the motor armature and said field winding will be supplied in parallel, and motor controlling means for starting up the motor armature and for weakening the motor field strength and for insuring a motor field of proper strength when the motor is started, said means comprising a magnetic winding energized independently of the armature current or the field current of said motor and responsive to no-voltage to cause a proper field strength for the motor when it is started up.

39. In combination, a permanently closed local loop containing a motor armature, an armature resistance and a field winding, a supply circuit, means for connecting said loop to said supply circuit so that the armature and armature resistance are in series with each other in a branch circuit, the field winding being in a parallel branch circuit, a resistance adapted to be inserted in the field winding branch circuit, a movable element adapted by its movement to vary both of said resistances, a winding energized independently of the current in the field winding branch circuit, said winding being adapted to automatically control the resistance in the field circuit under certain conditions.

40. The combination of an electric motor having a field winding energized independently of its armature current, and controlling means comprising a no-voltage magnet, the winding of said magnet being connected in parallel with said field winding, a movable contact element adapted to make and break the connection of said field winding to the supply circuit, and a mechanically protectively related independently movable element adapted by its movement to vary the field strength of the motor.

41. The combination of an electric motor having a field winding energized independently of its armature current, and controlling means comprising a no-voltage magnet, the winding of said magnet being connected in parallel with said field winding, a movable contact element adapted to make and break the connection of said field winding and said no-voltage winding to the supply circuit, and a mechanically protectively related independently movable element adapted by its movement to vary the field strength of the motor.

42. A motor having an armature winding and a shunt field winding, an armature resistance, a field resistance, a no-voltage magnet, and a spring actuated circuit controlling member adapted to be manually moved to establish the motor actuating current and to cut-out the armature resistance, and to be restrained by said magnet after said member has been manually moved to cut-out armature resistance, said member being automatically moved when released by said magnet upon the occurrence of no-voltage to insert the armature resistance and to cut-out the field resistance.

43. The combination of an electric motor, three movable controlling elements, one being a motor armature switch, one being a motor field rheostat, and the third being an automatic magnetic circuit breaker, and means for functionally relating said elements.

In testimony whereof I affix my signature in presence of two witnesses.

HARRY WARD LEONARD.

Witnesses:
 CAROLYN G. LEONARD,
 LEONARD KEBLER.